Figure 1:
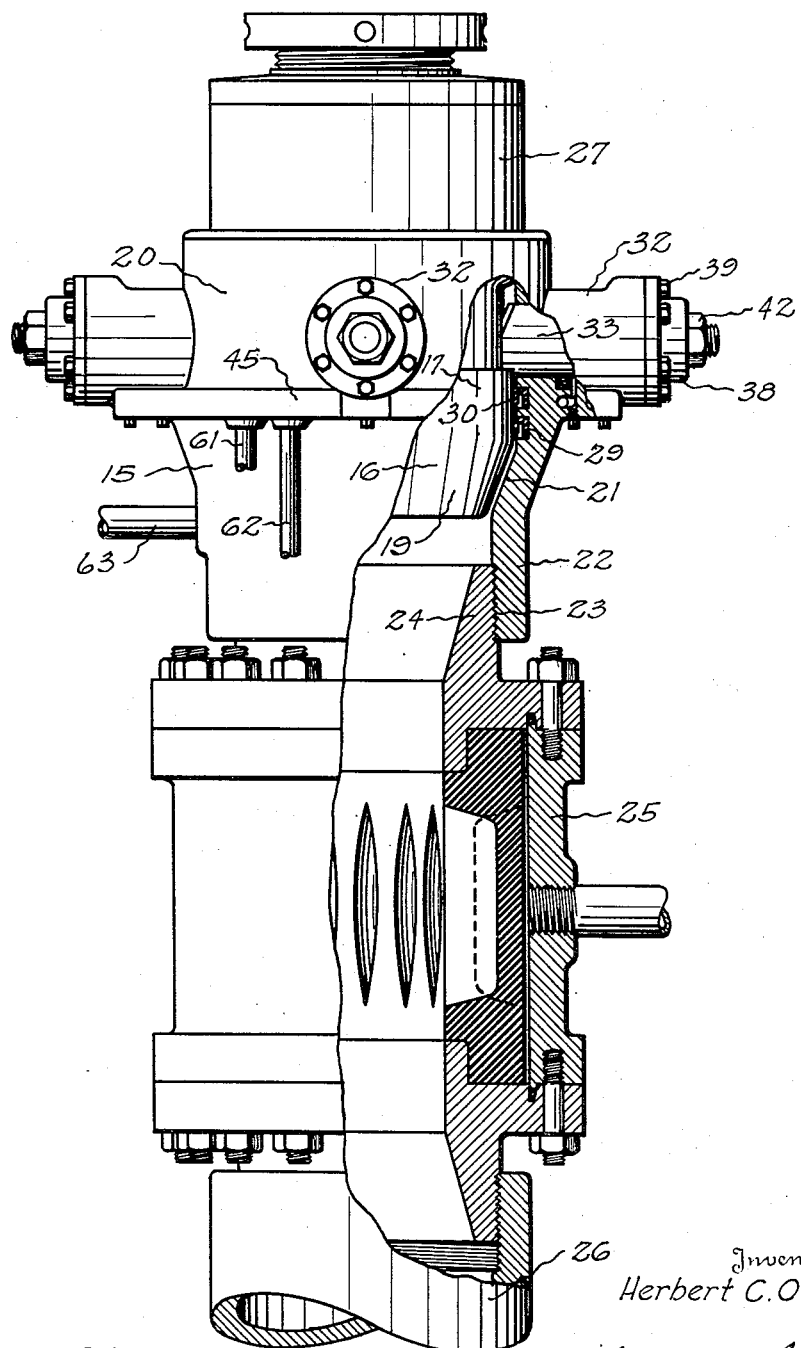

Jan. 30, 1940.          H. C. OTIS                2,188,557
                         UNION
                  Filed Jan. 10, 1938        2 Sheets-Sheet 1

Inventor
Herbert C. Otis

By Jack A. Ashley
Attorney

Jan. 30, 1940.  H. C. OTIS  2,188,557
UNION
Filed Jan. 10, 1938  2 Sheets-Sheet 2
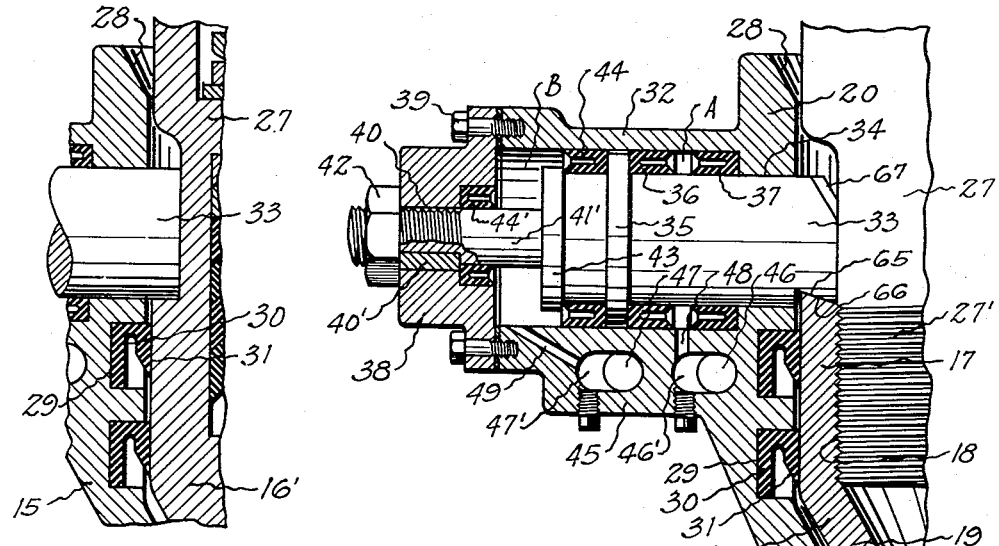
Fig. 3.
Fig. 2.
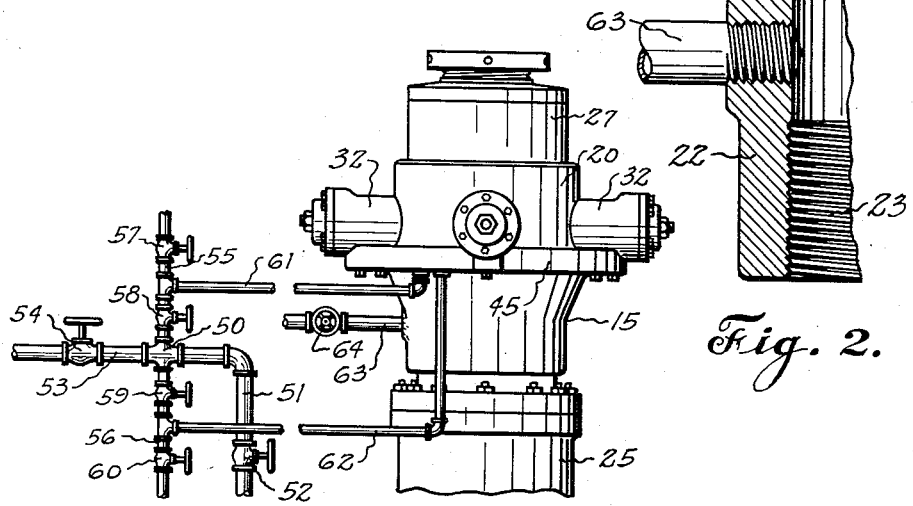
Fig. 4.
Inventor
Herbert C. Otis
By Jack A. Ashley
Attorney Patented Jan. 30, 1940

2,188,557

UNITED STATES PATENT OFFICE 2,188,557

UNION

Herbert C. Otis, Dallas, Tex.

Application January 10, 1938, Serial No. 184,134

7 Claims. (Cl. 166—14)

This invention relates to new and useful improvements in unions.

The invention has more particularly to do with an improved coupling or union, capable of automatic or manual operation, for uniting or securing together two members or elements, or releasing the same, and if desired, providing a fluid-tight joint; and the application setting forth the invention is filed as a continuation in part of my co-pending application, Serial No. 134,749.

A particular advantage of the invention is, that a union constructed in accordance therewith, is especially adapted for use in connecting well tools and devices without necessitating the presence of a workman below the derrick floor in order to make or break a connection, thus avoiding the hazards ordinarily encountered in the cellar or below the derrick floor. Where a workman is required to go below the derrick floor to couple or release connections he is exposed to gas leaks, oil leaks, fire hazards and the like. Owing to the difficulty of communication between the driller on the derrick floor and the workman below, serious accidents have occurred and often wells are let loose because of misunderstanding or inability to handle the connections, particularly where high pressures or great volumes of gas are flowing.

An important object of the invention is to provide means whereby the union may be operated entirely by fluid pressure, thus making it possible to operate the device from a remote or safe distance, which not only promotes safety, but saves time and labor.

Still another object of the invention is to provide improved fluid-actuated locking means, so arranged that when the members to be coupled are brought into coupling relation they will be automatically locked together, and if desired, a fluid-tight joint formed therebetween. This arrangement permits rapid coupling, and where the union is used between a drilling head and an oil saver or blowout preventer, or between other tools, the drilling head or other device may be quickly lowered and automatically coupled.

Another object of the invention is to provide a union wherein the coupled member, when subjected to a head pressure sufficient to displace it, cannot be released or removed from the coupling or receiving member, until the pressure is reduced and the locking means freed for retraction; together with fluid pressure retraction of the locking means. The provision which prevents releasing the locking means until the pressure is reduced tends to eliminate careless or accidental disconnection of the locked members, thus obviating escape of gas, leakage of oil, blowing out of a well, and other objections, when applied to a well or a pressure line.

A further object of the invention is to provide an improved union including a coupling member and a coupled member with locking elements carried by one of the members and adapted to co-act with the other member, together with fluid pressure actuating means for the locking elements arranged to both expel and retract said locking elements.

A further object of the invention is to provide a union wherein the members may be so locked that the entrant member may undergo longitudinal movement within the socket member and a fluid-tight joint maintained during such movement.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view, partly in elevation and partly in section showing a drilling head and an oil saver connected by a union constructed in accordance with the invention, Figure 2 is an enlarged, vertical, sectional view of a portion of the union, Figure 3 is a partial, vertical, sectional view showing the shoe made integral with the drilling head, and Figure 4 is an elevation showing the fluid supply control.

In the drawings, the numeral 15 designates a locking or receiving member or head, and 16 a keeper or attaching member. In the arrangement illustrated the head member has the general shape of a bell nipple, while the member 16 takes the form of an annular shoe. The shoe 16 is provided with an upright cylindrical portion 17 having internal screw threads 18 and an inwardly inclined flange 19. The head 15 includes an upright bowl 20 having an inclined annular seat 21 at its bottom and a cylindrical shank or skirt 22, depending from said seat. The flange 19 is of such diameter as to rest upon the seat 21. It is to be understood that the locking member and the keeper member may be made in the shape and form best suited to the purpose for which they are used, and the invention is not to be limited to shape or size.

The members 15 and 16 and 16' with their appurtenances constitute the union, and when used as a drilling connection, the member or head 15 is provided with internal screw threads 23 in the lower portion of its shank 22, for receiving the nipple 24 of a pressure fluid type of oil saver 25, which is mounted on the upper end of the well casing 26 as is shown in Figure 1. However, the head may be connected to any suitable tubular support.

The member or shoe 16 is shown with its screw threads 18 in engagement with threads 27' on the reduced lower end of a drilling head 27, but of course could be mounted on any other tool or device of the proper size to enter the bowl 20 of the head. The parts are of such diameters that the shoe 16 may have a free sliding engagement in the bowl 20 and the latter may have its inner upper edge beveled at 28 to guide the inclined flange 19 of the shoe into the bowl, said flange usually extending below the drilling head.

The bowl 20 just above the seat 21 (Figure 2) is formed with a pair of internal ring grooves 29 each adapted to receive a flexible packing ring 30. These rings are preferably non-metallic and are of the cup type, each having an inner, annular, depending lip 31, beveled along its lower edge, whereby the pressure fluid (oil, water or gas) flowing up through the head will expand said lips into sealing contact with the outer surface of the cylindrical portion 17 of the shoe. Such a packing prevents the escape of the pressure fluid from between the head and the shoe. Any suitable form of packing may be used and it need not be pressure expanded.

Between the upper ring groove 29 and the bevel 28, the bowl 20 is provided with a plurality of radial cylinders 32, four, equally spaced, being shown. In each cylinder a locking plunger 33 is mounted to slide radially of the head, the inner end of each plunger having a snug sliding fit in a circular opening 34 in the wall of the bowl (Figure 2), whereby the plunger may overhang the shoe 16 and lock the same in the head 15. Each plunger has a collar 35 near its outer end. Opposed non-metallic packing rings 36 and 37 of the V-shape or cup type, surrounding the plunger, are confined between the collar and the inner end of each cylinder, so that pressure fluid introduced between said rings will expand them into sealing contact with the plunger and the cylinder wall; and will also slide the plunger and the ring 36 outwardly to withdraw or retract said plunger and release the shoe 16.

A cap 38 is fastened on the outer end of each cylinder, which latter is enlarged to receive machine bolts 39, passing through said cap. The cap has a central enlarged aperture 40, through which passes a stem 41 extending axially from the plunger. The stem is screw-threaded and receives a nut 42 which engages the outer face of the cap and limits the inward stroke of the plunger. A key 40' carried by each stem 41 slides in the opening 40 and prevents revolution of said plunger. An external flange 43 on the outer end of the plunger co-acts with the flange 35 in confining a packing ring 44 similar to the ring 36 and open toward the cap 38, as well as extending oppositely to the said ring 36. The flange 35 acts to divide the cylinder 32 into an inner fluid chamber A and an outer fluid chamber B. A packing ring 44' sealed in the inner face of the cap 38 seals around the stem and co-acts with the ring 44.

A double manifold 45 surrounds the head and is made integral with the bottoms of the cylinders 32. The manifold includes an inner duct 46 and an outer duct 47. At each cylinder the ducts intersect chests 46' and 47'. The inner chest 46' communicates through a port 48 with the inner chamber A of the cylinder formed on the inner side of the flange 35, while the chest 47' connects with the outer chamber B of said cylinder through a port 49.

Pressure fluid, such as air, gas, oil or water, is supplied to a fourway connection 50 (Figure 4). In using oil or gas from a well a supply pipe 51 including a valve 52, may extend from the connection to a suitable point of attachment to the well equipment. If it is desired to supply the pressure fluid from another source, a pipe 53, including a valve 54, extends from the connection 50 to such source. Both the pipes 51 and 53, may be used, or one of them may be used and the connection plugged where the other is removed.

Pipes 55 and 56 extend oppositely from the connection 50 and each is open to atmosphere or serve to exhaust the pressure fluid from their ends. In the pipe 55 a pair of hand valves 57 and 58 are connected; while in the pipe 56, a pair of similar valves 59 and 60 are connected. A lead 61 extends from the pipe 55, between the valves 57 and 58 to the outer duct 47 of the manifold 45; while a similar pipe 62 extends from the pipe 56 between the valves 59 and 60 to the inner duct 46 of said manifold.

The head 15 has a pressure release pipe 63 connected in its skirt 22 below its seat 21, as is shown in Figures 2 and 4. This pipe includes a hand valve 64. The inner end of each locking plunger 33 is made with inner end undercut to form a downwardly inclined locking shoulder 65 for engaging a downwardly inclined annular lip 66 formed on the upper edge of the shoe 16. When the fluid pressure in the head 15 lifts the shoe and drilling head 27, the lip will lock the plunger against retraction. The upper edge of each plunger is preferably beveled at 67 to aid the inclined flange 19 of the shoe in displacing the plungers, when the drilling head is lowered into the head 15. The elements 65, 66 and 67 may be omitted or modified and are not essential to the invention. In Figure 3 the shoe 16' is formed integral with the drilling head 27 and the elements 65, 66 and 67 are omitted.

Assuming the parts to be in the position shown in Figure 2 and pressure fluid being supplied either through the pipe 51 or the pipe 53, the valve 59 would be closed and the valve 60 open, thereby exhausting fluid from the inner chamber A of each cylinder 32 by way of duct 46 and pipe 62. The valve 58 of the pipe 55 will be open and the valve 57 closed, thus supplying pressure fluid through the lead pipe 61 to the outer duct 47 and the chests 47' of each cylinder. This pressure fluid will flow through the ports 49 to the outer chamber B of each cylinder, whereby the plunger therein will be held in its locking position.

By reversing the position of the valve 59 and 60 and 57 and 58, the supply and exhaust of pressure fluid will be reversed and the plungers retracted. However, the plungers cannot be retracted until the valve 64 is opened and the well pressure below the shoe 16 released to permit said shoe and the drilling head to move down to the seat 21 and relieve the upward pressure against the plungers. When pressure fluid is supplied to the chamber A the packing rings 36 and 37 are expanded and seated and the same is true of the packing rings 44 and 44', when pressure is supplied to the chamber B.

In using the union the head 15 is mounted on the oil saver 25, as has been described. The drilling head 27 is assembled on the kelly (not shown) in the usual manner and the shoe 16 is slipped over the kelly and screwed onto said head. Once the drilling head is assembled on the kelly, it will always be lifted by the lower kelly sub when said kelly is elevated. After the drilling head has been mounted on the kelly and the latter made up on the drill pipe, the string is lowered into the hole, whereby the drilling head passes down through the rotary table (not shown) to the bowl 20 of the head 15. Pressure fluid having been admitted to the chambers A of each cylinder, as hereinbefore described, said plunger will be retracted so that their inner ends will not project into the bowl 20 of the head 15. As the drilling head 27 is carried downward the flange 19 of the shoe 16 enters the bowl 20 and should the plunger 33 not be fully retracted, said flange will strike the bevels 67 and fully displace said plunger. The flange will come to rest on the seat 21 of the head whereby further downward movement of the drilling head will be arrested, however, the kelly is free to move downwardly as it rotates. In order to lock the drilling head in place pressure fluid is supplied to the chamber B of each cylinder 32, as has hereinbefore been described. The presure fluid will force the plunger 33 into the bowl 20 until the plungers engage the head 27 and limit the inward travel of said plunger. When the oil saver 25 is opened the well pressure will raise or lift the drilling head and the shoe 16 until the inclined lip 66 engages the shoulder 65. This will lock the plunger in position and, if desired, fluid pressure may be released from the outer chamber B so that it is not necessary to carry fluid pressure in the cylinders 32 when the ocupling is locked. It will be seen that the coupling is entirely automatic and by arranging the hand valves above the derrick floor it is not necessary for a workman to go into the derrick cellar or below the floor.

When it becomes necessary to add an additional joint of drill pipe, the kelly is elevated until the lower sub passes through the oil saver. So long as the drilling head and shoe are exposed to the well pressure from below, the plunger 33 cannot be retracted; therefore, it is necessary to close the oil saver 25 to shut off the well pressure and then to open the valve 64 to release the trapped pressure between the oil saver and the rings 30. This will permit the drilling head and the shoe to drop in the head 15 until the flange 19 comes to rest upon the seat 21. When this is accomplished the lip 66 will be withdrawn from the shoulders 65, thereby freeing the plungers.

In order to retract the plungers 33 it is necessary to release the pressure fluid from the outer chamber B of each cylinder 32, provided this has not been done, by closing the valve 58 and opening the valve 57. After this step the valve 60 is closed and the valve 59 opened as hereinbefore described, whereby pressure fluid is supplied by the pipes 56 and 62 to the inner chamber A of each cylinder. When the pressure fluid has been supplied the plungers will be retracted thereby unlocking the union so that the kelly and the drilling head may be raised from the union head 15 through the rotary table. This is all accomplished without a man going below the derrick floor and from a safe and remote point. It will be seen that the union cannot be accidentally or carelessly opened because the shoe 16 locks the plungers until the well pressure is shut off. If the oil saver leaks when closed the drilling head will be held in its elevated position and such a leak will soon be observed. After the plungers have been retracted the supply of fluid pressure to the chamber A may be cut off and the chamber opened to its exhaust connection whereby it is not necessary to carry a head of fluid pressure in the union when the device is not in operation.

While the invention has been illustrated and described in connection with a drilling head it may be used and constructed in accordance with the scope of the appended claims, wherever it is found useful and desirable.

What I claim and desire to secure by Letters Patent, is:

1. A union including, an upright open ended receiving member, a keeper member arranged to be lowered into the open end of the receiving member and to be coupled to the latter, a movable locking element carried by the receiving member and co-acting with the keeper member to lock said members together when moved into locking position, fluid pressure actuating means for moving said locking element into locking position, and fluid pressure actuating means for retracting said element from its locking position, the receiving member having its bottom spaced from the bottom of the keeper member when the keeper and the locking element co-act to lock said members together, whereby said keeper member is free to move downwardly from the locking element when the well pressure is released below said keeper element.

2. A union including, an upright open ended receiving member, a keeper member arranged to be lowered into the open end of the receiving member and to be coupled to the latter, a movable locking element carried by the receiving member and co-acting with the keeper member to lock said members together when moved into locking position, fluid pressure actuating means for moving said locking element into locking position, fluid pressure actuating means for retracting said element from its locking position, and means for locking the locking elements in engagement with the keeper member, whereby the members are fastened together independently of the fluid pressure actuating means and whereby said means may be released during the locking engagement.

3. A union including, an upright open ended receiving member, a keeper member arranged to be lowered into the open end of the receiving member and to be coupled to the latter, a movable locking element carried by the receiving member and co-acting with the keeper member to lock said members together when moved into locking position, fluid pressure actuating means for moving said locking element into locking position, fluid pressure actuating means for retracting said element from its locking position, means for subjecting the keeper member to fluid pressure to move said member into locking engagement with the locking element, and means for releasing said last named fluid pressure to permit said keeper member to move out of locking engagement with locking element.

4. A union including, an upright open ended receiving member, a keeper member arranged to be lowered into the open end of the receiving member and to be coupled to the latter, a movable locking element carried by the receiving member and co-acting with the keeper member to lock said members together when moved into locking position, fluid pressure means for expelling said locking element into locking position and retracting said element from locking position, means for supplying fluid pressure to said keeper member to move it into locking engagement with said element and for cutting off such fluid supply and trapping the pressure fluid, and means to release said trapped pressure fluid to unlock the keeper member from the locking element.

5. The combination with a well fluid conductor and a well fixture adapted to be connected to said conductor, of means for coupling and locking the conductor and fixture together when said fixture is lowered to coupling position arranged to be actuated by oppositely operated fluid pressure means to lock and release said fixture, means for controlling the supply of pressure fluid to alternately operate said coupling means, and means for preventing release of the coupled fixture until the well pressure against said fixture is relieved.

6. A union including, an upright open ended head having an inclined seat and a fluid outlet below said seat, a packing ring mounted in the head above said seat arranged to be expanded by fluid pressure within said head, a laterally movable plunger mounted on the head above the packing ring and arranged to project into said head, fluid pressure means for operating said plunger in opposite directions, control means for said fluid pressure means whereby said plunger may be moved into and out of the bore of the head, and a shoe arranged to be detachably mounted on a well fixture adapted to be lowered into said head, said shoe having a flange for co-acting with the seat of the head and a lip at its upper end for engaging the plunger.

7. A union including, an upright open ended head having an inclined seat and a fluid outlet below said seat, a packing ring mounted in the head above said seat arranged to be expanded by fluid pressure within said head, a laterally movable plunger mounted on the head above the packing ring and arranged to project into said head, fluid pressure means for operating said plunger in opposite directions, control means for said fluid pressure means whereby said plunger may be moved into and out of the bore of the head, and a shoe arranged to be formed integral with a fixture adapted to be lowered into the head to engage the packing ring below the plunger, said shoe having a flange co-acting with the seat of the head.

HERBERT C. OTIS.